Patented June 14, 1938

2,120,931

UNITED STATES PATENT OFFICE 2,120,931

PRODUCTION OF PLASTIC COMPOSITIONS

Henry L. Cox, South Charleston, and Jacob D. Matlack, Charleston, W. Va., assignors to Carbide and Carbon Chemicals Corporation, a corporation of New York No Drawing. Application July 16, 1936, Serial No. 90,890

18 Claims. (Cl. 106—22)

Plastic compositions of various types in which resins or cellulose derivatives are colloided with high-boiling solvents, or plasticizers, are well known. In the production of such compositions, it is customary to assist the combination of the materials by employing such physical aids as heat, pressure, mechanical working, and combinations of these, or to use chemical aids, such as mutual solvents which subsequently are eliminated.

This invention is concerned with the formation of plastic compositions essentially composed of partial polyvinyl acetal resins colloided with ester plasticizers, and the principal object of the invention is to provide an efficient process for making these compositions simply and economically.

The partial polyvinyl acetal resins with which this invention is concerned are not soluble in ester plasticizers at ordinary temperatures, but these resins themselves have the property of dissolving sufficient quantities of ester plasticizers to yield adequately softened compositions. Such compositions are characterized by remarkable qualities of elasticity and resiliency coupled with great strength and toughness. In appearance, these compositions are clear and colorless, and the combination of resin with the plasticizer is so nearly permanent as to render them extremely valuable where lasting qualities of strength and elasticity over a wide range of temperatures are desired. A typical application of these plastic compositions is in the formation of laminated nonshattering glass, wherein a reinforcing plastic material of high strength, extreme clarity, good adhesion and permanent resiliency is of greatest importance.

Partial polyvinyl acetal resins may be formed, for example, by the incomplete condensation of aldehydes with polyvinyl alcohol, and they contain in the polymeric aggregate both acetal groups and free alcoholic hydroxyl groups. The degree to which the hydroxyl groups of the polyvinyl macromolecule have been combined with aldehyde may be indicated directly as percent (%) acetalization. A number of methods have been proposed for making partial polyvinyl acetal resins, and the process of this invention is applicable to the formation of plastic compositions from these resins however they are produced.

The object of this invention may be accomplished, and highly useful compositions of the type described may be readily prepared by introducing the ester plasticizer into the partial polyvinyl acetal resins by the aid of volatile nonsolvent organic liquids which wet or swell the resin, and enable it to be quickly and uniformly penetrated by the plasticizer. The nonsolvent liquid used in colloiding the resins with plasticizers may be added before, during, or after the addition of plasticizer. The entire mixture may be mechanically worked to facilitate the formation of a homogeneous composition, followed by elimination of the organic nonsolvent liquid from the plastic composition. Heat may be applied during the mixing operation which will result in elimination of the nonsolvent liquid by volatilization simultaneously with the formation of a homogeneously colloided composition. The mixing operation may be carried out by the usual methods of resin compounding, such as those involving differential roll mills or kneading and mixing machines. It is usually preferred to carry out the operation by adding the nonsolvent liquid to a mass of the resin in finely divided form, followed by addition of the required amount of plasticizer after the mass has been thoroughly wetted by the nonsolvent liquid. This mixture may then be mixed and heated in a dough-type mixing machine until it becomes homogeneous and a large part of the organic nonsolvent liquid has been evaporated. Final elimination of the nonsolvent may be carried out by heating the mass on a differential roll mill, or by heat alone.

The present invention is not applicable to polyvinyl acetal resins which are completely acetalized, or nearly so, and it may not be applied with best results to every partial polyvinyl acetal resin. Those resins which are best adapted for use in the process of the invention are prepared from polyvinyl compounds of high molecular weight, such as polyvinyl alcohol or an ester thereof of a molecular weight above about 10,000, and resins prepared from polyvinyl acetate having an average molecular weight of at least 25,000 are preferred. (Molecular weights referred to herein are those calculated by means of Staudinger's formula from viscosity determinations on solutions of the materials.) The suitability of a given resin of this type is determined by two additional factors, the more important of which is the degree of acetalization, and of almost equal importance is the nature of the aldehyde from which it is made. In general, the resins most useful in the process of this invention are acetalized between about 35% and about 90%, and the aldehydes from which the most desirable resins are made are those of the aliphatic series containing from two to six carbon atoms. Preferably, the aldehyde is saturated and straight-chained in structure, and of the aldehydes of this type, butyraldehyde, propionaldehyde and valeraldehyde are specifically preferred in the order given. The optimum degrees of acetalization which have been determined for resins for use in the process of this invention are from about 88% to 94% with acetaldehyde; from about 62% to 88% with propionaldehyde; from about 54% to 78% with butyraldehyde; and from about 39% to 58% with valeraldehyde.

The solubility characteristics of the partial polyvinyl acetal resins of this group are somewhat unusual. For example, these resins are soluble in the lower aliphatic alcohols, glycol ethers, and in nearly all water-soluble organic liquids, but they are not soluble in most water-insoluble organic liquids including the ester plasticizers and more volatile esters, such as ethyl and butyl acetates; the ketones, such as acetone; aliphatic or aromatic hydrocarbons and chlorinated hydrocarbons, such as pentane, hexane, benzene, toluene, chlorobenzene, chloroform and methylene chloride. All of the foregoing solubility characteristics refer to ordinary temperatures, and at elevated temperatures the solubility of these resins in such liquids as the esters becomes greater.

The ester plasticizers to which the process of this invention may be applied are those which are water-insoluble, and these may include phthalates of the glycols and glycol ethers, and of the lower alcohols. The corresponding esters of tartaric, succinic and related acids also may be used. The esters which are specifically preferred in the practice of this invention are the hexoic acid esters of polyethylene glycols. Examples of specific plasticizers which may be used are, diethyl and dibutyl phthalates, dibutyl tartrate, dichlorethyl phthalates, di(beta-butoxyethyl) phthalate, and the dihexoates of di-, tri-, tetra- and pentaethylene glycols. It is preferred to employ di(2-ethyl butyrates) or di(2-methyl pentoates) of diethylene and triethylene glycols.

The quantity of organic nonsolvent liquid required in carrying out this process may vary greatly. Roughly, equal parts by weight of the nonsolvent liquid and resin are preferred, and these relative proportions have proved to be wholly satisfactory in permitting the process to be conducted rapidly, efficiently and economically. In general, the organic nonsolvent should be at least equal to 50% by weight of the resin, and quantities greater than 200% by weight of the resin are superfluous and undesirable.

This process has many advantages over previously proposed methods for compounding resins with plasticizers. It is not only more rapid in operation, but it consistently results in more uniformly plasticized compositions. The effect of the volatile nonsolvent organic adjuvant in promoting the combination of partial polyvinyl acetal resins with ester plasticizers appears to be not only that of a temporary increase in the quantity of materials available for softening the resins, but that of causing a different kind of plasticization to take place. Methanol, a powerful mutual solvent for these resins and plasticizers, was found to give much less desirable results, since it yielded nonuniformly colloided compositions, and additionally, was more difficultly removable from the composition than were nonsolvent organic liquids of similar or even less volatility. In general, nonsolvent organic liquids were found to exert not only the maximum homogenizing power, but were, in every case, much more easily eliminated than resin solvents of similar volatility. The invention will be illustrated by the following examples:

*Example I*

The resin used in making this composition was a partial polyvinyl acetal which was about 66% acetalized with butyraldehyde. To 100 parts by weight of this resin in finely divided form was added 45 parts by weight of triethylene glycol di(2-ethyl butyrate). The plasticizer was thoroughly mixed with the resin which apparently absorbed the plasticizer so that it remained dry and the particles were not agglomerated. Thereafter, 100 parts by weight of acetone were added to the resin and plasticizer. After stirring, the mass was allowed to stand for twenty-four hours at a temperature of about 30° C. Most of the acetone was driven from the plasticized mass by milling it for twenty minutes on a differential roll mill at a temperature of 40° C., and the residual acetone was driven off by a short milling period at 130° C. When this composition was formed into sheets, it was found to be clear and homogeneous, and entirely free from ripples and undispersed resin particles. The amount of plasticizer was 31% by weight of the composition.

*Example II*

To 200 parts by weight of a partial polyvinyl acetal resin as used in Example I was added an equal weight of benzene. The mixture was stirred until the benzene thoroughly wetted the resin particles and caused them to become swollen. To this mass was then added 90 parts by weight of triethylene glycol di(2-ethyl butyrate). After the plasticizer had been stirred into the swollen mass, the mixture was allowed to stand for twenty-four hours at 30° C. At the end of this time the plasticized resin was milled on a differential roll mill, and the residual benzene was removed from the sheet by milling it at 130° C. for fifteen minutes. The resulting resin composition contained 31% by weight of plasticizer, and it was entirely free from uncolloided or unevenly dispersed resin particles.

*Example III*

Ninety parts by weight of dibutyl phthalate were dissolved in 200 parts by weight of diethyl ether, and this solution was stirred into 200 parts by weight of a partial polyvinyl acetal resin as used in the preceding examples. After this mass had remained at about 50° C. for thirty minutes, most of the ether was removed by milling the resin on a differential roll mill at 40° to 60° C. The composition was then milled at 80° C. for a few minutes to eliminate the remaining traces of ether. Sheets formed from this composition showed almost complete absence of uncolloided resin particles, and the same procedure, when carried out by allowing the resin to stand for a somewhat longer period of time in the presence of the ether and plasticizer, resulted in an entirely clear and homogeneous composition.

Many other compounding operations have been carried out which have demonstrated effectively the general utility of the process of this invention. Examples of suitable volatile nonsolvent organic liquids which have been used in carrying out the invention according to the procedure illustrated above, include methyl amyl ketone, diisopropyl ether, toluene, hexane, chloroform, ethylene dichloride, and ethyl acetate. In every case, the process resulted in the formation of homogeneous compositions of extreme clarity which were characterized by a total absence of uncolloided resin particles.

The compositions made by this process may, of course, contain various proportions of the ester plasticizer, and this invention is effective in forming plastic compositions containing any desired amount of ester plasticizer up to the maximum quantity with which the resin is capable of being combined. For many purposes, especially in the formation of nonshattering glass, compositions formed from the partial polyvinyl acetal resins in which the ester plasticizer constitutes from about 25% to about 50% by weight are desirable. Specifically, those compositions containing around 30% by weight of plasticizer are preferred for many uses.

Various modifications of the process will suggest themselves to those skilled in the art, and such variations are included within the scope of this invention as defined by the appended claims.

We claim:

1. Process for making clear and homogeneous plastic compositions essentially free of uncolloided particles which comprises intimately mixing a partial polyvinyl acetal resin with a compatible ester plasticizer in which said resin is insoluble at ordinary temperatures in the presence of a volatile organic compound which is a nonsolvent for the resin but which is capable of wetting and swelling the resin.

2. Process for making clear and homogeneous plastic compositions essentially free of uncolloided particles which comprises intimately mixing a partial polyvinyl acetal resin with a compatible ester plasticizer in which said resin is insoluble at ordinary temperatures in the presence of a volatile organic compound which is a nonsolvent for the resin but which is capable of wetting and swelling the resin, and thereafter separating the volatile compound from the resin and plasticizer.

3. Process for making clear and homogeneous plastic compositions essentially free of uncolloided particles which comprises intimately mixing a partial polyvinyl acetal resin with a compatible ester plasticizer in which said resin is insoluble at ordinary temperatures in the presence of a volatile organic compound which is a nonsolvent for the resin but which is capable of wetting and swelling the resin, and thereafter separating the volatile compound by evaporation from the resin and plasticizer.

4. Process for making clear and homogeneous plastic compositions essentially free of uncolloided particles which comprises intimately mixing a partial polyvinyl acetal resin with a compatible ester plasticizer in which said resin is insoluble at ordinary temperatures in the presence of a volatile organic compound which is a nonsolvent for the resin but which is capable of wetting and swelling the resin, said volatile compound being of the group consisting of ethers, esters, ketones, hydrocarbons and chlorinated hydrocarbons.

5. Process for intimately mixing a partial polyvinyl acetal resin with a compatible ester plasticizer in which said resin is unsoluble at ordinary temperatures to form a clear and homogeneous plastic composition essentially free of uncolloided particles which comprises adding to the resin a volatile organic compound which is a nonsolvent for the resin but which is capable of wetting and swelling the resin, introducing the ester plasticizer into the mixture of resin and volatile organic liquid, and thereafter separating said volatile compound from the resin and plasticizer.

6. Process for forming a clear and homogeneous plastic composition essentially free of uncolloided particles which comprises intimately mixing a partial polyvinyl acetal resin with a compatible ester plasticizer in which said resin is insoluble at ordinary temperatures by introducing said plasticizer into the resin in admixture with a volatile organic compound which is a nonsolvent for the resin but which is capable of wetting and swelling the resin.

7. Process for making clear and homogeneous plastic compositions essentially free of uncolloided particles which comprises intimately mixing a partial polyvinyl acetal resin with a compatible ester plasticizer in which said resin is insoluble at ordinary temperatures by introducing into a mixture of said plasticizer with said resin a sufficient quantity of a volatile organic compound which is a nonsolvent for the resin to wet and swell the resin to facilitate penetration of the plasticizer into the resin.

8. Process for intimately mixing a partial polyvinyl acetal resin with a compatible ester plasticizer in which said resin is insoluble at ordinary temperatures to form a clear and homogeneous plastic composition essentially free of uncolloided particles, which comprises introducing the plasticizer into the resin as a solution of said plasticizer in a volatile liquid comprising an organic compound which is a nonsolvent for the resin but which is capable of wetting and swelling the resin to facilitate penetration of the plasticizer into the resin.

9. Process for making clear and homogeneous plastic compositions essentially free of uncolloided particles which comprises intimately mixing a partial polyvinyl acetal resin with a compatible ester plasticizer in which said resin is insoluble at ordinary temperatures by the aid of a volatile organic compound which is a nonsolvent for the resin but which is capable of wetting and swelling the resin, said volatile compound being added to a mixture of the plasticizer and resin.

10. In a process for making clear and homogeneous plastic compositions essentially free of uncolloided particles in which a partial polyvinyl acetal resin acetalized between about 35% and about 90% is intimately mixed with a water-insoluble ester plasticizer in which said resin is insoluble at ordinary temperatures, the step which comprises introducing said plasticizer into said resin by the aid of a sufficient quantity of a volatile organic compound which is a nonsolvent for said resin and which is capable of wetting and swelling the resin to facilitate penetration of the resin by the plasticizer.

11. In a process for making clear and homogeneous plastic compositions essentially free of uncolloided particles in which a partial polyvinyl acetal resin acetalized between about 54% and about 78% with butyraldehyde is intimately mixed with from about 25% to about 50% by weight of a water-insoluble ester plasticizer in which said resin is insoluble at ordinary temperatures, the step which comprises introducing said plasticizer into said resin by the aid of a sufficient quantity of a volatile organic compound which is a nonsolvent for said resin but which is capable of wetting and swelling the resin to facilitate penetration of said plasticizer into said resin.

12. In a process for making clear and homogeneous plastic compositions essentially free of uncolloided particles in which a partial polyvinyl acetal resin acetalized between about 54% and about 78% with butyraldehyde is intimately mixed with a polyethylene glycol hexoate, said resin being insoluble in said polyethylene glycol hexoate at ordinary temperatures, the step which comprises introducing said hexoate into said resin by the aid of a sufficient quantity of a volatile organic compound which is a nonsolvent for said resin but which is capable of wetting and swelling said resin to facilitate penetration of said hexoate into said resin.

13. Process for intimately mixing partial polyvinyl acetal resins with water-insoluble ester plasticizers in which said resins are insoluble at ordinary temperatures to form clear and homogeneous plastic compositions essentially free of uncolloided particles which comprises introducing said plasticizers into said resins by the aid of volatile organic compounds which are nonsolvents for said resins but which are capable of wetting and swelling said resins, said organic compounds being present in an amount equal to from about 50% to about 200% by weight of said resins.

14. Process for making clear and homogeneous plastic compositions essentially free of uncolloided particles in which a partial polyvinyl acetal resin acetalized from about 54% to about 78% with butyraldehyde is intimately mixed with triethylene glycol di(2-ethyl butyrate), which comprises introducing the plasticizer into the resin by the aid of a sufficient quantity of a volatile organic compound which is a nonsolvent for the resin but which is capable of wetting and swelling the resin to facilitate penetration of the plasticizer into the resin.

15. Process for making clear and homogeneous plastic compositions essentially free of uncolloided particles in which a partial polyvinyl acetal resin acetalized from about 35% to about 90% is intimately mixed with a compatible water-insoluble ester plasticizer in which said resin is insoluble at ordinary temperatures, which comprises introducing said plasticizer into said resin by the aid of a volatile organic compound of the group consisting of ethers, esters, ketones, hydrocarbons and chlorinated hydrocarbons, in an amount approximately equal to the weight of said resin.

16. Process for making clear and homogeneous plastic compositions essentially free of uncolloided particles in which a partial polyvinyl acetal resin acetalized about 66% with butyraldehyde is intimately mixed with triethylene glycol di(2-ethyl butyrate), which comprises introducing the ester into said resin by means of approximately an equal weight of a volatile organic compound which is a nonsolvent for said resin and which is capable of wetting and swelling said resin, and thereafter eliminating said volatile organic compound by evaporation.

17. Process for intimately mixing a partial polyvinyl acetal resin derived from a polyvinyl body having a molecular weight above about 10,000 and acetalized with one of the group consisting of acetaldehyde from about 88% to about 94%, propionaldehyde from about 62% to about 88%, butyraldehyde from about 54% to about 78%, and valeraldehyde from about 39% to about 58%, with a compatible ester plasticizer in which said resin is insoluble at ordinary temperatures to form a clear and homogeneous plastic composition essentially free of uncolloided particles which comprises introducing said plasticizer into said resin by the aid of a sufficient quantity of a volatile organic compound which is a nonsolvent for said resin but which is capable of wetting and swelling said resin to facilitate penetration of said plasticizer into said resin.

18. Process for intimately mixing a partial polyvinyl acetal resin derived from a polyvinyl body having a molecular weight above about 10,000 and acetalized with one of the group consisting of acetaldehyde from about 88% to about 94%, propionaldehyde from about 62% to about 88%, butyraldehyde from about 54% to about 78%, and valeraldehyde from about 39% to about 58%, with a polyethylene glycol dihexoate to form a clear and homogeneous plastic composition essentially free of uncolloided particles which comprises introducing said polyethylene glycol dihexoate into said resin by the aid of a sufficient quantity of a volatile organic compound which is a nonsolvent for said resin but which is capable of wetting and swelling said resin to facilitate penetration of said polyethylene glycol dihexoate into said resin.

HENRY L. COX.
JACOB D. MATLACK.